(12) United States Patent
Park et al.

(10) Patent No.: US 8,712,476 B2
(45) Date of Patent: Apr. 29, 2014

(54) METHOD AND APPARATUS FOR PROVIDING SPIN-HOME FUNCTION FOR MOBILE COMMUNICATION TERMINAL

(75) Inventors: Youngmin Park, Seongnam-si (KR); Hoojong Kim, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 1105 days.

(21) Appl. No.: 11/911,277

(22) PCT Filed: Jun. 15, 2006

(86) PCT No.: PCT/KR2006/002302
§ 371 (c)(1),
(2), (4) Date: Oct. 11, 2007

(87) PCT Pub. No.: WO2007/145387
PCT Pub. Date: Dec. 21, 2007

(65) Prior Publication Data
US 2009/0291676 A1 Nov. 26, 2009

(51) Int. Cl.
*H04M 1/00* (2006.01)
(52) U.S. Cl.
USPC .......................... 455/566; 715/810; 715/813
(58) Field of Classification Search
USPC ........... 455/418, 550.1, 455, 416, 403, 412.1, 455/466, 90.2, 557, 575.1–575.3; 715/700, 715/810, 243, 817; 345/55, 1.1, 619, 684; 370/328, 389, 252
See application file for complete search history.

(56) References Cited

U.S. PATENT DOCUMENTS

| 6,363,264 B1 * | 3/2002 | Overy et al. ................ 455/566 |
| 7,350,158 B2 * | 3/2008 | Yamaguchi et al. ......... 715/834 |
| 2003/0038825 A1 * | 2/2003 | Wen et al. .................... 345/700 |
| 2003/0100323 A1 * | 5/2003 | Tajima et al. ................ 455/502 |
| 2004/0155907 A1 * | 8/2004 | Yamaguchi et al. ......... 345/810 |
| 2004/0204144 A1 * | 10/2004 | Lim ............................. 455/566 |
| 2004/0250217 A1 * | 12/2004 | Tojo et al. .................... 715/810 |
| 2005/0032544 A1 * | 2/2005 | Jei .............................. 455/550.1 |
| 2005/0130642 A1 * | 6/2005 | Scott ............................ 455/418 |
| 2005/0243760 A1 * | 11/2005 | Yoshioka ..................... 370/328 |
| 2006/0030370 A1 * | 2/2006 | Wardimon .................... 455/566 |
| 2006/0095916 A1 | 5/2006 | Nishida |
| 2006/0099938 A1 * | 5/2006 | Lee ............................... 455/418 |
| 2006/0290661 A1 * | 12/2006 | Innanen et al. .............. 345/156 |
| 2007/0155373 A1 * | 7/2007 | Kim .............................. 455/418 |

FOREIGN PATENT DOCUMENTS

| JP | 2001-245352 | 9/2001 |
| KR | 1020030083896 | 4/2005 |

* cited by examiner

*Primary Examiner* — Edward Urban
*Assistant Examiner* — Golam Sorowar
(74) *Attorney, Agent, or Firm* — Lowe Hauptman & Ham, LLP (57) ABSTRACT

A method and an apparatus for providing a spin-home function for a mobile communication terminal having a key input module, a microprocessor, a program memory, a data storage module, and an LCD display module so that applications are circulated and displayed on an idle screen. The method includes steps of (a) designating at least one application as a spin-home; (b) running a spin-home program stored in the program memory; (c) circulating next application designated as the spin-home and displaying the application on the LCD display module every time the user operates a second key button for circulating the idle screen; and (d) setting an application currently displayed on the LCD display module as the idle screen when the user operates a confirmation key button.

22 Claims, 5 Drawing Sheets

METHOD AND APPARATUS FOR PROVIDING SPIN-HOME FUNCTION FOR MOBILE COMMUNICATION TERMINAL

CROSS REFERENCE TO RELATED APPLICATION

This application is the National Phase application of International Application No. PCT/KR2006/002302, filed Jun. 15, 2006, which designates the United States and was published in English. This application, in its entirety, is incorporated herein by reference.

TECHNICAL FIELD

The present invention relates to an apparatus and a method for providing a spin-home function for a mobile communication terminal. More particularly, the present invention relates to an apparatus and a method for providing a spin-home function for a mobile communication terminal so that, when a user of the mobile communication terminal, which includes a key input module, a microprocessor, a program memory, a data storage module, and an LCD display module, designates an application, which is stored in the program memory, as a spin-home and runs a spin-home program, the application, which has been designated as the spin-home, is circulated and displayed on the LCD display module every time the user operates a specific key.

BACKGROUND ART

As generally known in the art, mobile communication systems have evolved from $1^{st}$ generation analog AMPS (Advanced Mobile Phone System) and $2^{nd}$ generation cellular/PCS (Personal Communication Service) systems into $3^{rd}$ generation IMT-2000 (International Mobile Telecommunication 2000), which has been recently standardized by ITU-R and commercialized in line with development in information/communication technologies. The IMT-2000 includes CDMA 2000 1X, 3X, EV-DO, and WCDMA (Wideband CDMA) and uses an IS-95SC network, which has evolved from conventional IS-95A and IS-95B networks, so that it can provide a wireless Internet service at a maximum data transmission rate of 144 Kbps, which is substantially faster than that of the IS-95A or IS-95B network (14.4 Kbps or 56 Kbps). Particularly, the IMT-2000 not only improves the quality of conventional voice communication service and WBS (Wireless Broadcasting Service), but also provides various multimedia services (e.g. AOD, VOD) at a faster speed.

Such evolution of mobile communication systems are followed by evolution of mobile communication terminals into multipurpose devices, which can provide various types of applications in addition to basic voice communication. Users can download various pieces of multimedia data, such as images, moving pictures, music, and games, and run the data by using mobile communication terminals. Mobile communication terminals incorporate various types of convenient functions (e.g. electronic organizer, photo editor, camera). In addition, mobile communication terminals can realize colorful graphic environment on the idle screen, as a result of improved performance of LCD drivers.

The idle screen is a starting point for using various applications provided by mobile communication terminals. Furthermore, each user can decorate the idle screen with his favorite photo, image, or animation and express his own personality.

Particularly, a user of a conventional mobile communication terminal can download a photo, image, or animation from the service provider and decorate the idle screen with it by using a WAP script. Alternatively, the user may set up the idle screen by downloading a non-interactive application (phone theme) or an interactive application (e.g. "1 mm" or "MoA" service available from SK Telecom., Inc.) and installing it.

Korean Registered Patent No. 10-0486516 discloses a method for using a frequently-used application (e.g. schedule management, text message, address book) for the idle screen of a mobile communication terminal so that its user can directly run the application without complicated steps of operation. This method seeks to enhance the functionality of the mobile communication terminal, in addition to enabling the user to set up the idle screen as desired in an attempt to express his personality.

However, conventional methods for setting up the idle screen have the following problems.

First, once an application is used for the idle screen, it is impossible to present another application on the same idle screen.

Second, when another application is to be used for the idle screen, tree-structured menu items must be searched through a number of steps, which renders it inconvenient to modify the idle screen.

Third, although basic applications (e.g. address book, text message) may be given shortcuts on the key input module for direct access, the limited number of key buttons on the terminal makes it impossible to assign shortcuts to all of the ever-increasing applications.

DISCLOSURE OF THE INVENTION

Accordingly, the present invention has been made to solve the above-mentioned problems occurring in the prior art, and an object of the present invention is to provide an apparatus and a method for providing a spin-home function for a mobile communication terminal so that, when a user of the mobile communication terminal, which includes a key input module, a microprocessor, a program memory, a data storage module, and an LCD display module, designates an application, which is stored in the program memory, as a spin-home and runs a spin-home program, the application, which has been designated as the spin-home, is circulated and displayed on the LCD display module every time the user operates a specific key.

In order to accomplish this object, there is provided a method for providing a spin-home function for a mobile communication terminal having a key input module, a microprocessor, a program memory, a data storage module, and an LCD display module so that applications are circulated and displayed on an idle screen, the method including the steps of (a) designating at least one application as a spin-home; (b) running a spin-home program stored in the program memory, when a user operates a first key button for driving the spin-home program, and displaying a first application designated as the spin-home on the LCD display module; (c) circulating next application designated as the spin-home and displaying the application on the LCD display module every time the user operates a second key button for circulating the idle screen; and (d) setting an application currently displayed on the LCD display module as the idle screen when the user operates a confirmation key button.

In accordance with another aspect of the present invention, there is provided an apparatus for providing a spin-home function for a mobile communication terminal, the apparatus including a program memory for storing a spin-home program adapted to circulate and display at least one application designated as a spin-home when a user operates a key; a data storage module acting as a data buffer when the spin-home program is run by the mobile communication terminal, the data storage module temporarily storing data inputted by the user or storing character or image data received by the mobile communication terminal from an outside; a key input module for inputting characters and numbers, the key input module having a special key for causing a predetermined function of the mobile communication terminal to be run; an LCD display module for displaying operating conditions of the mobile communication terminal together with date and time, the operating conditions including power utilization condition and radio wave reception strength; and a microprocessor for running the spin-home program, when the user operates a key button for driving the spin-home program, and controlling the LCD display module so as to display a first application designated as the spin-home, the microprocessor controlling the LCD display module so as to display next application in accordance with the spin-home program when the user operates a key button for circulating an idle screen.

BRIEF DESCRIPTION OF THE DRAWINGS

The above and other objects, features and advantages of the present invention will be more apparent from the following detailed description taken in conjunction with the accompanying drawings, in which.

BEST MODE FOR CARRYING OUT THE INVENTION

Hereinafter, a preferred embodiment of the present invention will be described with reference to the accompanying drawings. In the following description and drawings, the same reference numerals are used to designate the same or similar components, and so repetition of the description on the same or similar components will be omitted.

Figure 1:
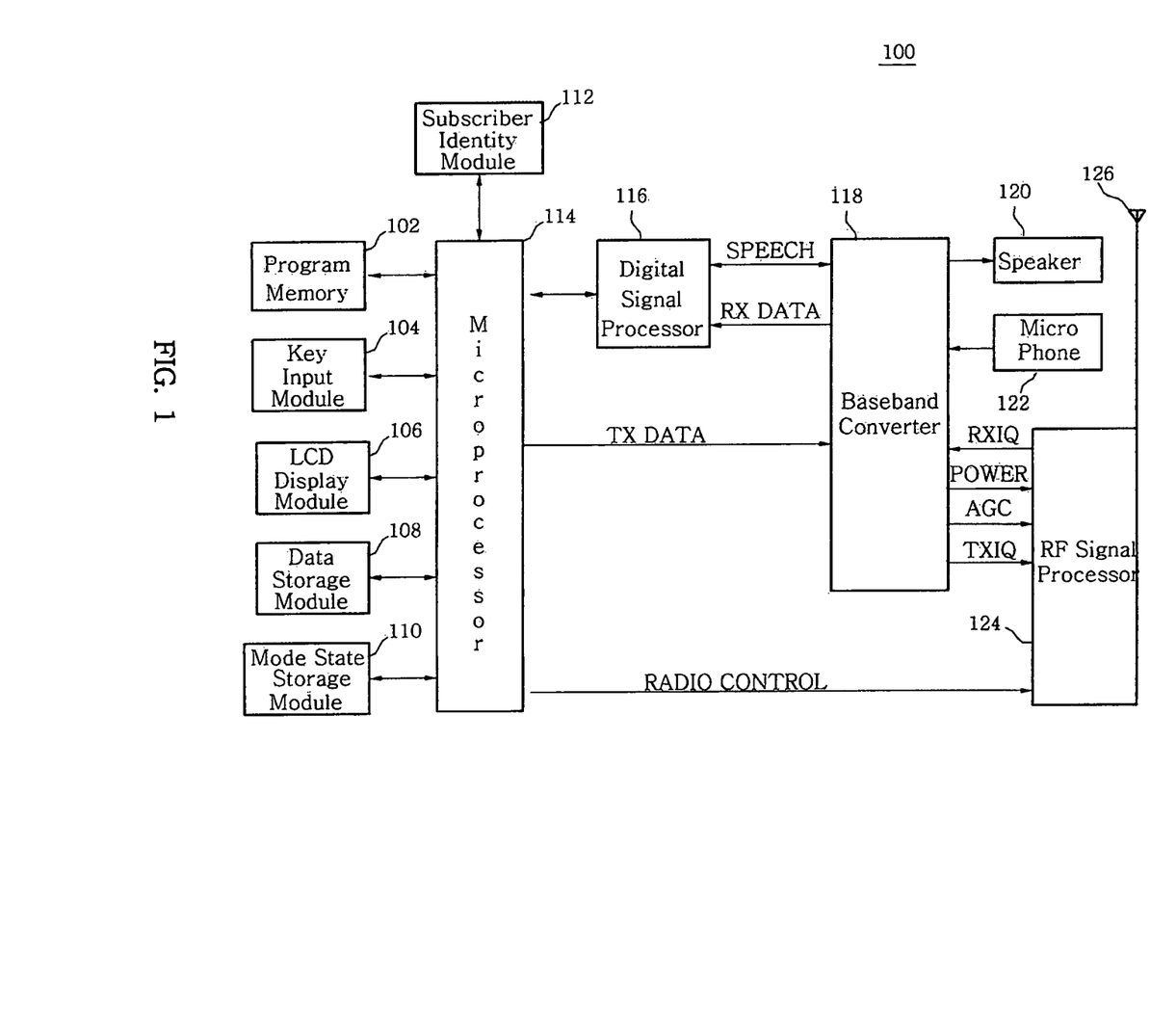
FIG. 1 shows the construction of a mobile communication terminal according to a preferred embodiment of the present invention.

FIG. 1 shows the construction of a mobile communication terminal according to a preferred embodiment of the present invention.

A mobile communication terminal 100 according to a preferred embodiment of the present invention includes a program memory 102; a key input module 104; an LCD display module 106; a data storage module 108; a mode state storage module 110; a subscriber identity module 112; a microprocessor 114; a digital signal processor 116; a baseband converter 118; a speaker 120; a microphone 122; an RF (radio frequency) signal processor 124; and an antenna 126.

The key input module 104 according to a preferred embodiment of the present invention has numeric keys for inputting numbers (e.g. telephone numbers), character keys for inputting characters, function keys for performing specific functions, and direction keys. When the user presses a key button, the key input module 104 generates key data, which corresponds to the pressed key button, and transmits the data to the microprocessor 114. Particularly, the key input module 104 may separately have a dedicated spin-home key button for providing a spin-home function.

The program memory 102 according to a preferred embodiment of the present invention stores a protocol software for processing messages transmitted/received to/from a mobile communication network, an operating system, a control program for controlling the overall operation of the mobile communication terminal, and applications. Particularly, the program memory 102 stores a spin-home program for circulating at least one application, which has been designated as a spin-home, and displaying it on the LCD display module 106 when the user operates the dedicated spin-home key button, which is separately installed on the key input module 102, or one of existing key buttons.

Preferably, the program memory 102 additionally stores a screen setup program for displaying application items, which have been designated as the spin-home, on the LCD display module when the user operates a specific key button while the mobile communication terminal is in an idle mode. When the user selects one or more of the items, the spin-home setup of the selected application is toggled on/off in accordance with the user's selection.

The program memory 102 may store a program for managing the contact addresses of persons, with whom the user of the mobile communication terminal 100 makes frequent contact, and displaying the list of a predetermined number of contact addresses in the order of frequent contact on the LCD display module 106 when the user operates a specific key. In addition, the program memory 102 may store a program for extracting contact addresses, to which shortcuts have been assigned, and displaying the list of contact addresses on the LCD display module 106 when the user operates a specific key.

The program memory 102 may also contain a program for creating a list of recently used applications and displaying it on the LCD display module 106.

In addition, the program memory 102 preferably stores a shortcut program for implementing a function similar to that of shortcut icons on the base screen of conventional computers. Particularly, when the user assigns a shortcut to at least one application, an icon is designated for the application. When the user operates a key for selecting a shortcut icon screen in an idle mode, the LCD display module 106 displays the shortcut on the screen. When the user selects a specific icon on the shortcut icon screen, a corresponding application is driven. Although the program automatically designates an icon for the application in this case, the user may select a desired icon.

The program memory 120 for storing various programs may be an EEPROM (electrically erasable and programmable read only memory), for example, which can not only read, but also electrically erase recorded data and rerecord data. Each program may be implemented by using a C programming language, objected-oriented C++, or JAVA, depending on the operating system supported by the mobile communication terminal.

Any of the above-mentioned list of frequently used contact addresses, list of contact addresses having shortcuts assigned thereto, list of recently used application, and shortcut icon screen may be designated as the spin-home, which is displayed on the LCD display module 106 one by one every time the user operates a key button for circulating the idle screen.

The data storage module 108 according to a preferred embodiment of the present invention usually acts as a data buffer when the mobile communication terminal 100 runs a program. The data storage module 108 temporarily stores data inputted by the key input module 102. In addition, the data storage module 108 stores other pieces of data, including characters and images received by the mobile communication terminal 100 from the outside. The data storage module 108 may be a RAM (random access memory), for example.

The LCD display module 106 according to a preferred embodiment of the present invention displays the operating conditions of the mobile communication terminal 100, including power utilization and radio wave reception strength, together with date and time. When the user operates a key button for circulating the idle screen, the LCD display module 106 replaces the application, which has been designated as the spin-home, with a new one and displays it.

The microprocessor 114 according to a preferred embodiment of the present invention controls the overall operation of the mobile communication terminal 100 in accordance with a state flag stored in the mode state storage module 110. Particularly, when the user operates a key button for running a spin-home program and generates a corresponding signal, the microprocessor 114 reads the signal and outputs a spin-home program, which is stored in the program memory 102, to the data storage module 108. Then, the program is run. The microprocessor 114 loads a first application, which has been designated as a spin-home, onto the data storage module in accordance with the program and controls the LCD display module so as to display the application. When the user operates a key button for circulating the idle screen, the microprocessor loads the next application, which has been designated as the spin-home, onto the data storage module in accordance with the spin-home program, which is currently run. Then, the microprocessor controls the LCD display module so as to replace the first application with the next application and display it.

The key button for running the spin-home program or circulating the idle screen may be a dedicated spin-home key button separately installed on the key input module 102 of the mobile communication terminal 100, as mentioned above. Alternatively, existing key buttons may be used to implement the function of the dedicated spin-home key button. For example, when a downward movement button is operated while the mobile communication terminal 100 is in an idle mode, the spin-home program is driven. When a leftward or rightward movement button is operated in this condition, the LCD display module 106 circulates and displays each application, which has been designated as the spin-home, as will be described later in more detail.

The mode state storage module 110 stores the current operating mode of the mobile communication terminal 100 as a state flag (0, 1, 2 . . . ) in accordance with the selection made via the key input module 102. The subscriber identity module 112 stores subscriber registration information (e.g. proper number, personal security key), which is allocated to each subscriber's terminal.

The digital signal processor (hereinafter, referred to as DSP) 116 acts as an equalizer for coding or decoding audio signals and removing multi-path noise, in addition to processing audio data. The DSP 116 transmits/receives audio data SPEECH to/from the baseband converter 118. In addition, the DSP 116 receives digital data RX DATA from the baseband converter 118.

The baseband converter 118 converts signals, which are transmitted/received among the RF signal processor 124, the DSP 116, the speaker 120, and the microphone 122, into baseband signals through DAC (digital to analog conversion) and ADC (analog to digital conversion). The baseband converter 118 sends transmission data TXIQ to the RF signal processor 124 and controls the power POWER of the RF signal processor 124 or automatically controls its gain AGC. In addition, the baseband signal processor 124 gets reception signal RXIQ from the RF signal processor 124.

The RF signal processor 124 demodulates and amplifies RF signals received from the antenna 126. In addition, the RF signal processor 124 modulates transmission signals from the baseband converter 118 and emits them into propagation space. The speaker 120 outputs audible sound based on the audio data from the baseband converter 118 and converts the user's voice input into electric signals.

The antenna 126 receives signals from the RF signal processor 124 and transmits them to the outside, and vice versa.

Figure 2:
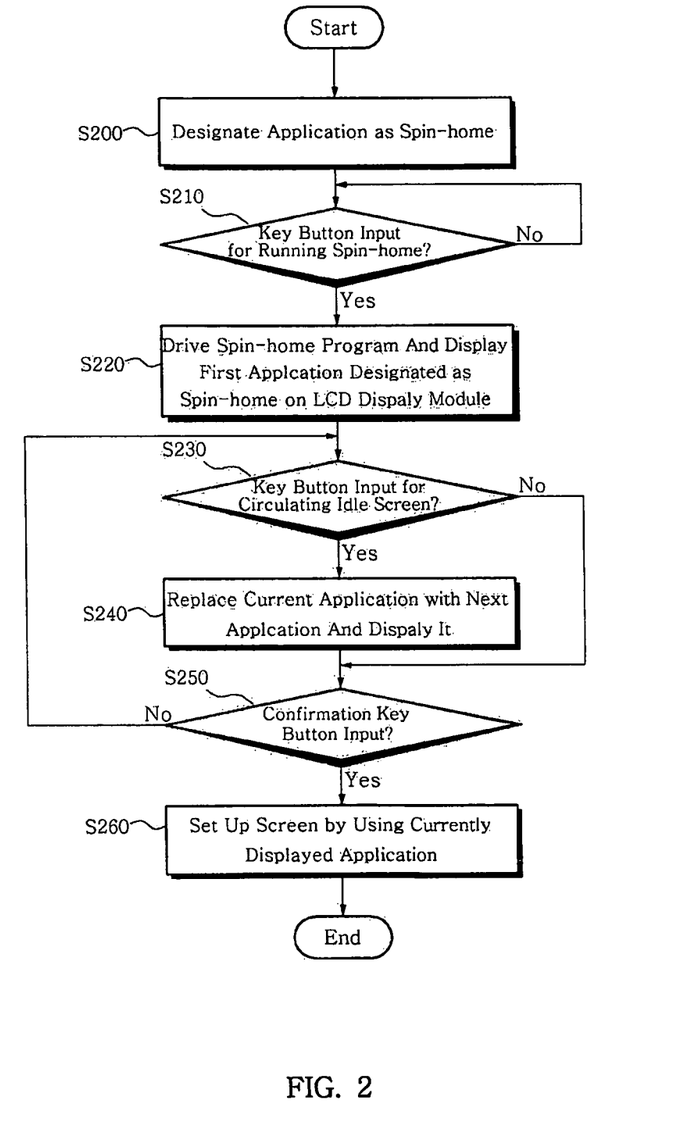
FIG. 2 is a flowchart showing a method for providing a spin-home for a mobile communication terminal according to a preferred embodiment of the present invention.

FIG. 2 is a flowchart showing a method for providing a spin-home for a mobile communication terminal according to a preferred embodiment of the present invention.

The user of the mobile communication terminal 100 designates at least one application as a spin-home (S200). Particularly, the user selects a spin-home addition/deletion item from menu items of each application and generates a corresponding signal. Then, the microprocessor 114 reads the signal and adds/deletes spin-home number data to/from the selected application. When a spin-home program is run at a later time, each application is circulated and displayed in the order of its number. The user may drive a screen setup program and conveniently modify the spin-home on/off setup of the application, which has been designated as the spin-home. Particularly, when a specific key button (e.g. upward movement key button) is operated while the mobile communication terminal 100 is in an idle mode and a corresponding signal is generated, the microprocessor 114 reads the signal and outputs a screen setup program to the data storage module 108, which is then run. In addition, the microprocessor 114 displays application items, which have been designated as the spin-home, on the LCD display module 106. Then, the user selects at least one of the displayed items and generates a corresponding signal. The microprocessor 114 reads the signal and toggles on/off the spin-home setup of the selected application. If the spin-home setup of an application is toggled off, it is not displayed on the LCD display module 106 even when the spin-home program is run.

Applications designated as the spin-home include schedule management, address book, list of recently used applications, game, text message, and shortcut icon screen, as well as image or moving picture in a broader sense. In the case of address book, the contact address of a specific person, which has been selected by the user, may be designated as the spin-home. It is also possible to designate the contact addresses of persons, which have shortcuts assigned thereto, or a number of frequently used contact addresses, which have been automatically selected by the microprocessor, as the spin-home.

The microprocessor 114 monitors if the key button for driving the spin-home program is operated (S210). When the key button is operated, the microprocessor 114 drives the spin-home program and displays the first application (i.e. application having the smallest spin-home number) of the applications, which have been designated as the spin-home, on the LCD display module 106 (S220).

When the user operates the key button for circulating the idle screen and generates a corresponding signal, the microprocessor 114 reads the signal (S230). Then, the microprocessor 114 replaces the first application with the next application, which has been designated as the spin-home, and displays it on the LCD display module 106 (S240).

When the user operates the confirmation key button OK, the microprocessor 114 sets up the idle screen by using the application, which is currently displayed on the LCD display module 106 (S250, S260). Otherwise, the microprocessor 114 returns to step S230.

FIGS. 3a to 3d show the screen of a mobile communication terminal, which has a dedicated spin-home key button, when the terminal provides a spin-home function.

Figure 3:
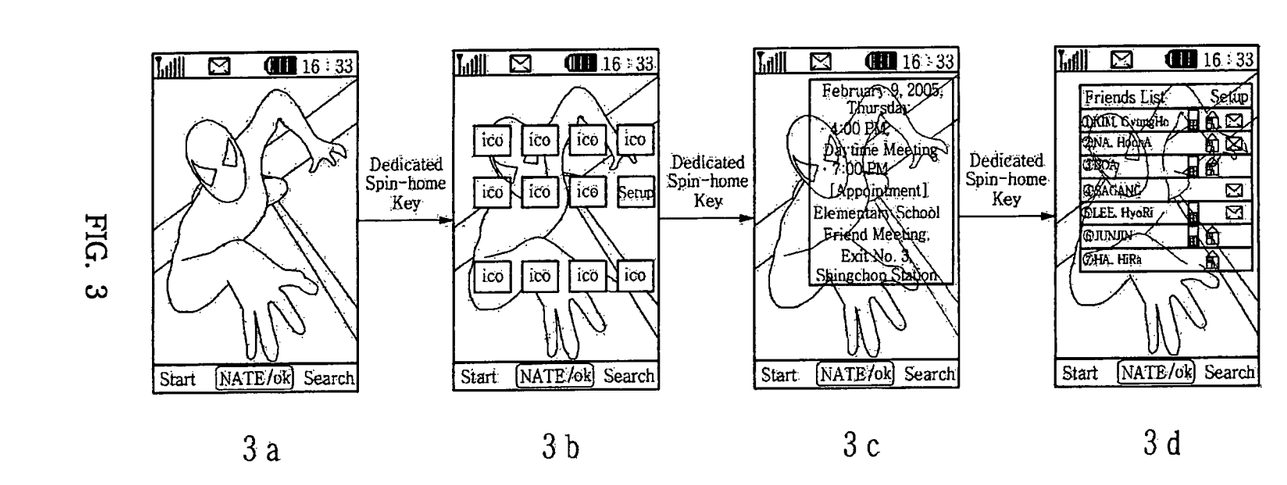
FIGS. 3a to 3d show the screen of a mobile communication terminal, which has a dedicated spin-home key button, when the terminal provides a spin-home function.

FIG. 3a shows the screen in an idle mode before the spin-home program is run. When the dedicated spin-home key button is operated, the spin-home program is run. At the same time, the screen is switched to a shortcut icon screen, which has a spin-home number of 1, as shown in FIG. 3b. Every time the dedicated spin-home button is operated, the schedule management (FIG. 3c), which has a spin-home number of 2, and the list of contact addresses of friends (FIG. 3d), which has a spin-home number of 3, are circulated and displayed.

FIGS. 4a to 4f show the screen of a mobile communication terminal, which has conventional key buttons, when the terminal provides a spin-home function.

Figure 4:
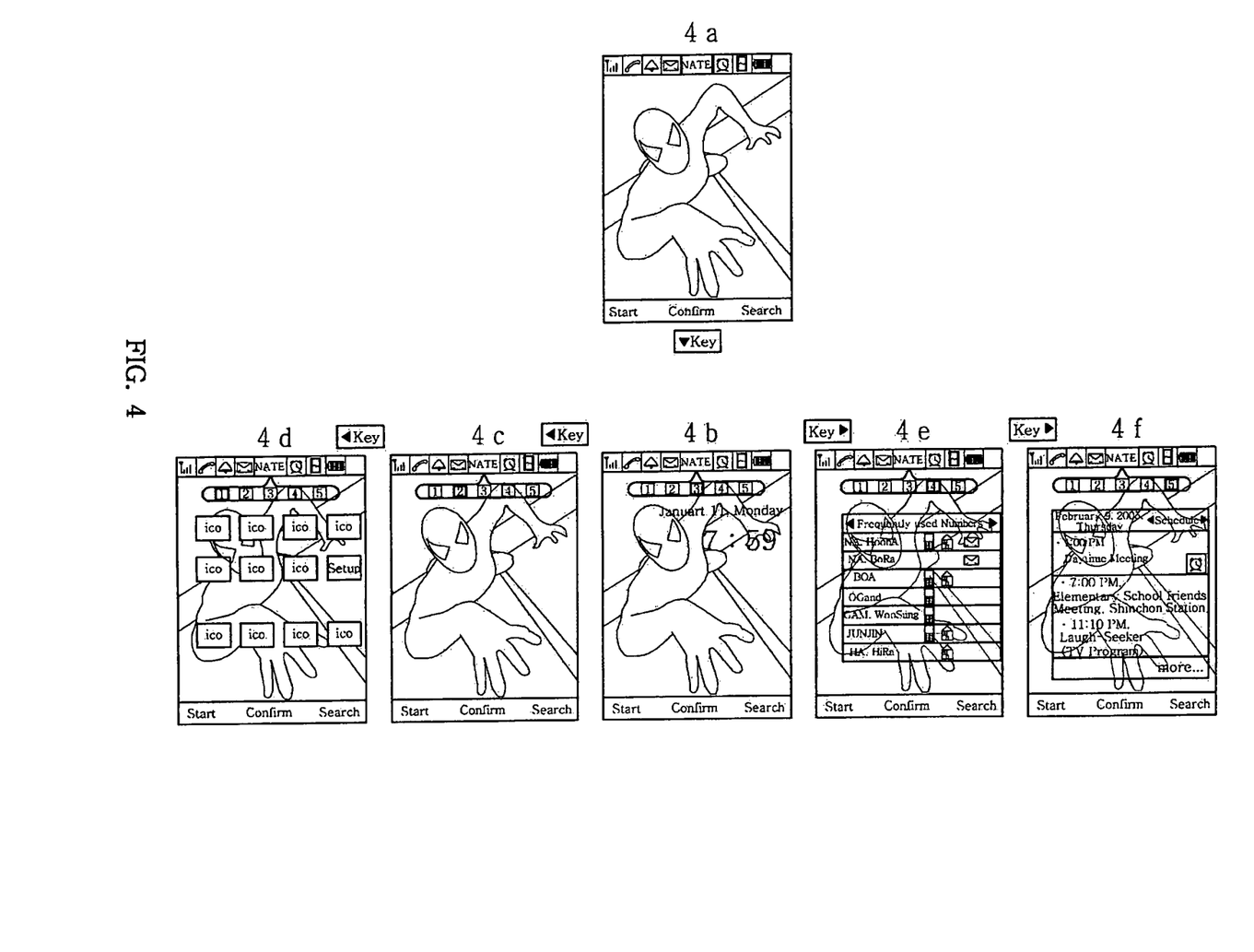
FIGS. 4a to 4f show the screen of a mobile communication terminal, which has conventional key buttons, when the terminal provides a spin-home function.

FIG. 4a shows the screen in an idle mode before the spin-home program is run. When the confirmation key button is operated in the idle mode, the terminal accesses a wireless Internet service (e.g. Nate®). When the downward movement key button is operated in the idle mode, the spin-home program is run and switches the screen to a spin-home screen, as shown in FIG. 4b. Every time the leftward movement key button is operated, applications having a spin-home number of 2 and 1, respectively, are circulated and displayed (FIGS. 4c and 4d). Similarly, every time the rightward movement key button is operated, applications having a spin-home number of 4 and 5, respectively, are circulated and displayed (FIGS. 4e and 4f).

Although the leftward or rightward movement key button is operated to circulate and display the applications, which have been designated as the spin-home, in FIGS. 4a to 4f, the role of each key button is not limited to that in the present invention. For example, the downward movement key button may be operated to run the spin-home program and display the application, which has the smallest spin-home number. In addition, the left or rightward movement key button may be operated to circulate and display the applications in the ascending or descending order of spin-home number.

Figure 5:
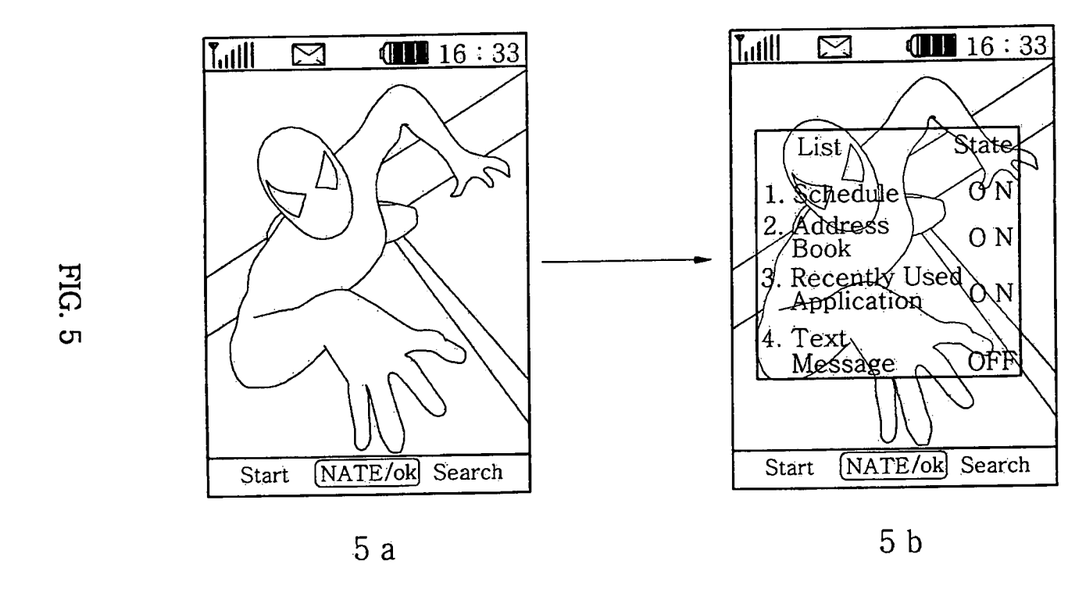
FIGS. 5a and 5b show the screen of a mobile communication terminal when a screen setup program is run.

FIGS. 5a and 5b show the screen of a mobile communication terminal when a screen setup program is run.

When a specific key button (e.g. upward movement key button) is operated in an idle mode (FIG. 5a), the screen setup program is run and displays application items, which have been designated as the spin-home, as shown in FIG. 5b. By selecting desired items, the spin-home setup of selected applications is toggled on/off in a convenient manner.

Although a preferred embodiment of the present invention has been described for illustrative purposes, those skilled in the art will appreciate that various modifications, additions and substitutions are possible, without departing from the scope and spirit of the invention as disclosed in the accompanying claims.

Industrial Applicability

As mentioned above, the present invention is advantageous in that, even when an application is currently used for the idle screen, it can be easily replaced with another application by single key input. The idle screen setup can also be easily modified.

In addition, various applications (e.g. image, animation, address book, schedule management) can be conveniently circulated and displayed on the idle screen without using shortcuts to run the applications.

The invention claimed is:

1. A method of providing an application selection function for a mobile communication terminal having a key input module, a microprocessor, a program memory, a data storage module, and a display module, the method comprising the steps of:
   (a) designating a plurality of sequence numbers to a corresponding plurality of applications in response to an input of a user;
   (b) running an application selection program stored in the program memory when the user operates a first key button for driving the application selection program, and displaying a first application of the plurality of applications on the display module;
   (c) displaying a next application of the plurality of applications according to an order of the designated plurality of sequence numbers, in a circular manner, on the display module every time the user operates a second key button; and
   (d) adopting an application currently displayed on the display module as an idle screen when the user operates a confirmation key button, the idle screen being displayed on the display module when said mobile communication terminal is in an idle mode,
   wherein in step (c), only one application among the plurality of applications is displayed on the display module at a time, and
   wherein step (a) includes the steps of:
      (a1) driving a screen setup program stored in the program memory when the user operates a predetermined key button, and displaying the application that is designated as the idle screen on the display module; and
      (a2) toggling on/off the displayed idle screen corresponding to the designated application in accordance with user selection when the user selects at least one of application items displayed on the display module.

2. The method as claimed in claim 1, wherein the designation of the plurality of sequence numbers is performed in accordance with user selection of a spin-home addition/deletion item of a menu item of the corresponding plurality of applications.

3. The method as claimed in claim 1, wherein the first key button for driving the application selection program and the second key button for circulating the next application are dedicated spin-home key buttons separately positioned on the mobile communication terminal.

4. The method as claimed in claim 1, wherein the first key button for driving the application selection program is a downward movement key button, and the second key button for circulating the idle screen is a leftward/rightward movement key button.

5. The method as claimed in claim 1, wherein the application adopted as the idle screen is selected from schedule management, address book, recently used applications, game, text message, image, moving picture, or shortcut icon screen.

6. The method as claimed in claim 5, wherein the address book designated as the idle screen and displayed on the display module is a book selected from a book of contact addresses of persons designated by the user, a book of contact addresses of persons, shortcuts being assigned to the contact addresses, or a book of frequently-used contact addresses of a predetermined number of persons, the contact addresses being automatically managed by the microprocessor.

7. An apparatus of providing an application selection function for a mobile communication terminal, the apparatus comprising:

a microprocessor configured to execute an application selection program;

a data storage module coupled to the microprocessor and configured to act as a data buffer when the application selection program is executed;

a key input module configured to input characters and numbers, the key input module having a first key arranged for causing the execution of the application selection program;

a display module coupled to the microprocessor and configured to display an idle screen, the idle screen displayed on the display module when said mobile communication terminal is in an idle mode; and a program memory encoded to store the application selection program, the application selection program being configured to cause the microprocessor to perform a method comprising:

in response to the first key being operated by a user, initiating the application selection program and displaying a first application of a plurality of applications on the display module, the plurality of applications each having a corresponding one of a plurality of sequence numbers designated in response to an input of the user;

in response to a second key being operated, displaying a next application of the plurality of applications on the display module as a currently displayed application according to an order of the designated plurality of sequence numbers in a circular manner, wherein only one application among the plurality of applications is displayed on the display module at a time; and adopting the currently displayed application as the idle screen in response to a confirmation key being operated, wherein the program memory is further encoded to store a screen setup program, the screen setup program being configured to cause the microprocessor to:

display application items of one of the plurality of applications adopted as the idle screen on the LCD display module when the user operates a predetermined key button while the mobile communication terminal is in the idle mode, and toggle on/off the displayed idle screen corresponding to the adopted application in accordance with user selection when the user selects at least one of the application items.

8. The apparatus as claimed in claim 7, wherein the key input module has a dedicated spin-home key button configured as the first key.

9. The apparatus as claimed in claim 7, wherein the program memory is further encoded to store a contact management program, the contact management program is configured to cause the microprocessor to:

automatically manage frequently used contact addresses of the user during an interval; and display a list of the contact addresses on the display module in response to key input from the user.

10. The apparatus as claimed in claim 7, wherein the program memory is further encoded to store an extracting program, the extracting program is configured to cause the microprocessor to:

extract contact addresses and shortcuts being assigned to the contact addresses by the user, and display a list of the contact addresses on the display module in response to key input from the user.

11. The apparatus as claimed in claim 7, wherein the program memory is further encoded to store an obtaining program, the obtaining program is configured to cause the microprocessor to obtain a list of application used by the user for a period of time from present time and displaying the list on the display module in response to key input from the user.

12. The apparatus as claimed in claim 7, wherein the program memory is further encoded to store a shortcut program, the shortcut program is configured to cause the microprocessor to:

assign an icon to at least one application, when the at least one application is associated with a shortcut, display a shortcut icon screen on the display module when the user selects the shortcut icon screen in an idle screen setup mode, and activate the at least one application corresponding to the icon when the user selects the icon via key input.

13. The apparatus as claimed in claim 12, wherein the icon is designated by the user.

14. A method of changing an idle screen for a mobile terminal having a first key, a second key, and a confirmation key, the method comprising:

designating a plurality of sequence numbers to a corresponding plurality of applications in response to an input of a user;

in response to the first key being operated by the user, initiating an application selection program stored in a program memory of the mobile terminal and displaying one of the plurality of applications having a smallest sequence number among the plurality of applications on a display module of the mobile terminal, thereby the one of the plurality of applications becoming a currently displayed application;

in response to the second key being operated, executing the application selection program and displaying a next application on the display module, the next application being next to the currently displayed application according to an order of the designated plurality of sequence numbers in a circular manner, thereby the next application becoming the currently displayed application, wherein only one application among the plurality of applications is displayed on the display module at a time together with a plurality of indicators corresponding to the plurality of sequence numbers; and in response to the confirmation key being operated, adopting the currently displayed application as the idle screen, the idle screen being displayed on the display module when the mobile terminal is in an idle mode.

15. The method of claim 14, further comprising:

adding another sequence number to another application or removing the corresponding sequence number of one of the plurality of applications by operating a spin-home addition/deletion menu item.

16. The method of claim 14, wherein the first key and the second key are dedicated key buttons separately positioned on the mobile terminal.

17. The method of claim 14, wherein the first key is a downward movement key button positioned on the mobile terminal, and the second key is a leftward/rightward movement key button positioned on the mobile terminal.

18. The method of claim 14, wherein the plurality of applications comprises one or more of the following applications: schedule management, address book, list of recently used applications, game, text message, image, moving picture, or shortcut icon screen.

19. A method of providing an application selection function for a mobile communication terminal having a key input module, a microprocessor, a program memory, a data storage module, and a display module, the method comprising the steps of:
  (a) designating a plurality of sequence numbers to a corresponding plurality of applications in response to an input of a user;
  (b) running an application selection program stored in the program memory when the user operates a first key button for driving the application selection program, and displaying a first application of the plurality of applications on the display module;
  (c) displaying a next application of the plurality of applications according to an order of the designated plurality of sequence numbers, in a circular manner, on the display module every time the user operates a second key button; and
  (d) adopting an application currently displayed on the display module as an idle screen when the user operates a confirmation key button, the idle screen being displayed on the display module when said mobile communication terminal is in an idle mode,
  wherein in step (c), only one application among the plurality of applications is displayed on the display module at a time, and
  wherein step (c) comprises displaying on the display module, together with only one application among the plurality of applications, a plurality of indicators corresponding to the plurality of sequence numbers.

20. The method as claimed in claim 19, wherein, in step (c), one of the plurality of indicators corresponding to the only one application being displayed on the display module is displayed differently from the other indicators.

21. The method as claimed in claim 19, wherein step (b) comprises displaying on the display module
  only the first application among the plurality of applications, and
  the plurality of indicators corresponding to the plurality of sequence numbers.

22. The method as claimed in claim 21, wherein, in step (b), one of the plurality of indicators corresponding to the first application is displayed differently from the other indicators.

* * * * *